(12) United States Patent
Roh et al.

(10) Patent No.: US 8,472,569 B2
(45) Date of Patent: Jun. 25, 2013

(54) FINE SYMBOL TIMING ESTIMATION (75) Inventors: June Chul Roh, Allen, TX (US);
Srinath Hosur, Plano, TX (US);
Timothy M. Schmidl, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 192 days.

(21) Appl. No.: 12/961,271

(22) Filed: Dec. 6, 2010

(65) Prior Publication Data
US 2012/0140858 A1 Jun. 7, 2012

(51) Int. Cl.
*H03D 1/00* (2006.01)
*H04L 27/06* (2006.01)

(52) U.S. Cl.
USPC ........... 375/343; 375/354; 375/355; 375/340; 375/316; 327/141; 358/409; 370/503; 713/400; 714/12

(58) Field of Classification Search
None
See application file for complete search history.

(56) References Cited

U.S. PATENT DOCUMENTS

| | | | | |
|---|---|---|---|---|
| 5,764,102 A | * | 6/1998 | Cochran et al. | 329/304 |
| 6,154,487 A | * | 11/2000 | Murai et al. | 375/150 |
| 6,459,745 B1 | * | 10/2002 | Moose et al. | 375/355 |
| 2004/0190560 A1 | * | 9/2004 | Maltsev et al. | 370/503 |
| 2006/0098751 A1 | * | 5/2006 | Zhang et al. | 375/260 |
| 2006/0132662 A1 | * | 6/2006 | Ahn | 348/731 |
| 2008/0181317 A1 | * | 7/2008 | Kim | 375/260 |

OTHER PUBLICATIONS

The Institute of Electrical and Electronics Engineers, Inc., "Draft Standard for Body Area Network," IEEE P802.15.6/D01, May 2010, New York, NY, 218 pages.

* cited by examiner

*Primary Examiner* — Shuwang Liu
*Assistant Examiner* — Gina McKie
(74) *Attorney, Agent, or Firm* — Alan A. R. Cooper; Wade J. Brady, III; Frederick J. Telecky, Jr.

(57) ABSTRACT

Systems and methods for fine symbol timing estimation are disclosed herein. In one embodiment, a wireless receiver includes a differential detector, a correlator, a coarse symbol timing estimator, and a fine symbol timing estimator. The differential detector is configured to detect phase differences in a received preamble signal modulated using differential phase shift keying. The correlator is configured to correlate symbol values output by the differential detector against a reference sequence. The coarse symbol timing estimator is configured to generate a coarse symbol timing estimate, and to generate a coarse timing sample symbol index value corresponding to the coarse symbol timing estimate. The fine symbol timing estimator is configured to generate a fine symbol timing estimate that is more accurate than the coarse symbol timing estimate based on the coarse timing sample symbol index value and correlation samples at index values preceding and succeeding the coarse timing sample index value.

4 Claims, 7 Drawing Sheets

FIG. 8

FINE SYMBOL TIMING ESTIMATION

BACKGROUND

A wireless receiver includes symbol timing estimation to allow the receiver to extract symbols from a received signal. Body area networks ("BANs"), based on the IEEE 802.15.6 standard for example, are low-power short-range wireless networks. BANs are applicable to various short range applications, including control and monitoring of medical devices, such as pacemakers. Robust and accurate symbol timing estimation is desirable in BANs and other wireless networks.

SUMMARY

Systems and methods for fine symbol timing estimation are disclosed herein. In one embodiment, a wireless receiver includes a differential detector, a correlator, a coarse symbol timing estimator, and a fine symbol timing estimator. The differential detector is configured to detect phase differences in a received preamble signal modulated using differential phase shift keying. The correlator coupled to the differential detector, and is configured to correlate symbol values output by the differential detector against a reference sequence. The coarse symbol timing estimator is configured to generate a coarse symbol timing estimate, and to generate a coarse timing sample index value corresponding to the coarse symbol timing estimate. The fine symbol timing estimator is coupled to the correlator and to the coarse symbol timing estimator. The fine symbol timing estimator is configured to generate a fine symbol timing estimate that is more accurate than the coarse symbol timing estimate based on the coarse timing sample index value and correlation samples at index values preceding and succeeding the coarse timing sample index value. The fine symbol timing estimate may further be based on a correlation sample corresponding to the coarse timing sample index value.

In another embodiment, a method includes detecting, by a wireless receiver, phase differences in a signal modulated using differential phase shift keying. The symbol values generated by the detecting are correlated against a preamble reference sequence. A coarse timing sample index corresponding to a coarse symbol timing estimate is identified based on the correlation samples produced by the correlating. A fine symbol timing estimate is generated based on the coarse timing sample index and a first correlation sample corresponding to a first index that is lower than the coarse timing sample index and a second correlation sample corresponding to a second index that is higher than the coarse timing sample index.

In yet another embodiment, a preamble symbol timing extraction system includes a preamble correlator, a coarse symbol timing estimator, and a fine symbol timing estimator. The preamble correlator is configured to generate correlation samples by correlating symbols derived from differential phase shift keyed data with a correlation reference sequence. The coarse symbol timing estimator is configured to generate a coarse preamble symbol timing estimate based on the correlation samples. The fine symbol timing estimator is configured to generate a fine preamble symbol timing estimate based on the coarse preamble symbol timing estimate and the correlation samples.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. Further, the term "software" includes any executable code capable of running on a processor, regardless of the media used to store the software. Thus, code stored in memory (e.g., non-volatile memory), and sometimes referred to as "embedded firmware," is included within the definition of software.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
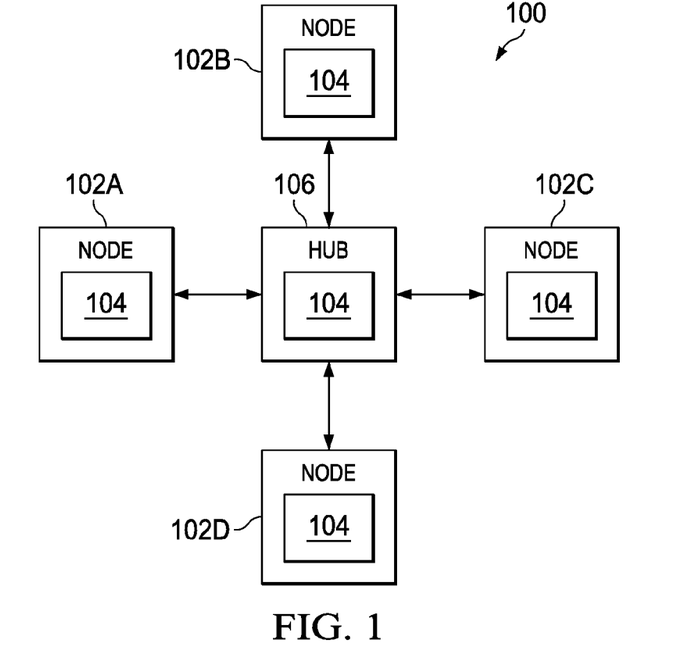
FIG. 1 shows a block diagram of a wireless network that includes fine symbol timing estimation in accordance with various embodiments.

FIG. 1 shows a block diagram of a wireless network 100 that includes fine symbol timing estimation in accordance with various embodiments. Some embodiments of the network 100 may be in accordance with the IEEE 802.15.6/D01, Draft Standard for Body Area Network, May 2010, or variants thereof. Other embodiments of the network 100 may be in accordance with other wireless networking standards known in the art. The network 100 includes a hub 106 and one or more nodes 102 that wirelessly communicate with the hub 106. Each node 102 includes a transceiver comprising a medium access control ("MAC") layer and a physical ("PHY") layer that facilitate wireless interaction with the hub 106. The PHY includes a PHY receiver 104 that processes physical layer packets. The hub 106 manages the network 100 by coordinating node 102 medium access and power management. The node 106 generally includes the functionality of a node 102 including the PHY receiver 104.

The PHY receiver 104 processes a wirelessly received physical layer protocol data unit ("PPDU"), which includes a physical layer convergence protocol ("PLOP") preamble followed by a PLOP header and a physical layer service data unit ("PSDU"). The PLOP preamble is the first received component of the PPDU.

The PHY receiver 104 processes the preamble to detect a packet, to perform timing synchronization, and to estimate carrier frequency offset. Embodiments of the PHY receiver 104 process the preamble to estimate coarse symbol timing, and further process the estimated coarse symbol timing to estimate fine symbol timing. Estimated coarse symbol timing may be accurate to within a fraction of a symbol time. A fine symbol timing estimate is preferably more accurate than the corresponding coarse symbol timing estimate. Thus, embodiments of the PHY receiver 104 employ fine symbol timing estimation in addition to coarse symbol timing estimation to produce accurate and robust symbol timing estimates.

Figure 2:
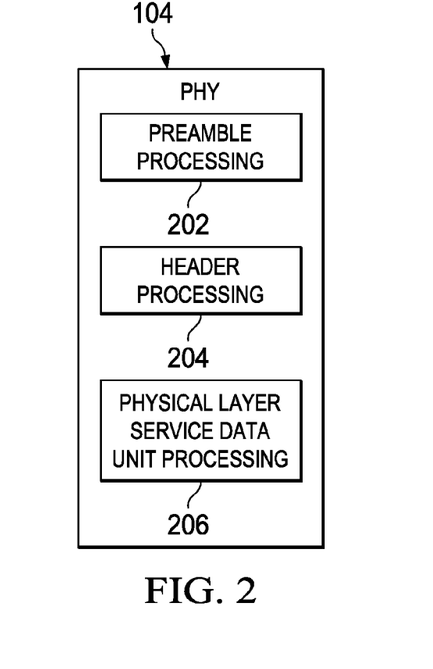
FIG. 2 shows a block diagram of a wireless receiver physical layer that includes fine symbol timing estimation in accordance with various embodiments.

FIG. 2 shows a block diagram of the PHY receiver 104 in accordance with various embodiments. The PHY receiver 104 includes a PSDU processing component 206, a header processing component 204, and a preamble processing component 202. The header processing component 204 decodes a received header to extract information used to decode the PSDU.

The PSDU processing component 202 decodes the PSDU and extracts embedded MAC data, e.g., a MAC header, MAC frame body, frame check sequence for processing in the MAC layer of the receiver.

The preamble processing component 202 includes various sub-components, as further described below, to perform packet detection and symbol timing estimation. As an example of a preamble processed by the preamble processing component 202, in the IEEE draft standard for BAN (IEEE 802.15.6), the PLOP preamble is 90 symbols long. The PLOP preamble has two portions: the first portion is the M-sequence (63 symbols), followed by extension sequence (27 symbols long). All the symbols in the preamble may be modulated with rotated differential binary phase shift keying ("PSK"). Embodiments of the preamble processing component 202 can be limited to the M sequence of the preamble for packet detection and symbol timing, that is, the first portion of the preamble. However, any sequence is possible if the sequence is deterministic and known to both the transmitter and the receiver. A transceiver compliant with IEEE BAN may use a part of the M-sequence or a non-zero subset of the M-sequence, or a longer sequence that includes part of, a non-zero subset of, or all of the M-sequence and the part or all of the extension sequence, or all or part of the extension sequence without the M-sequence.

Figure 3:
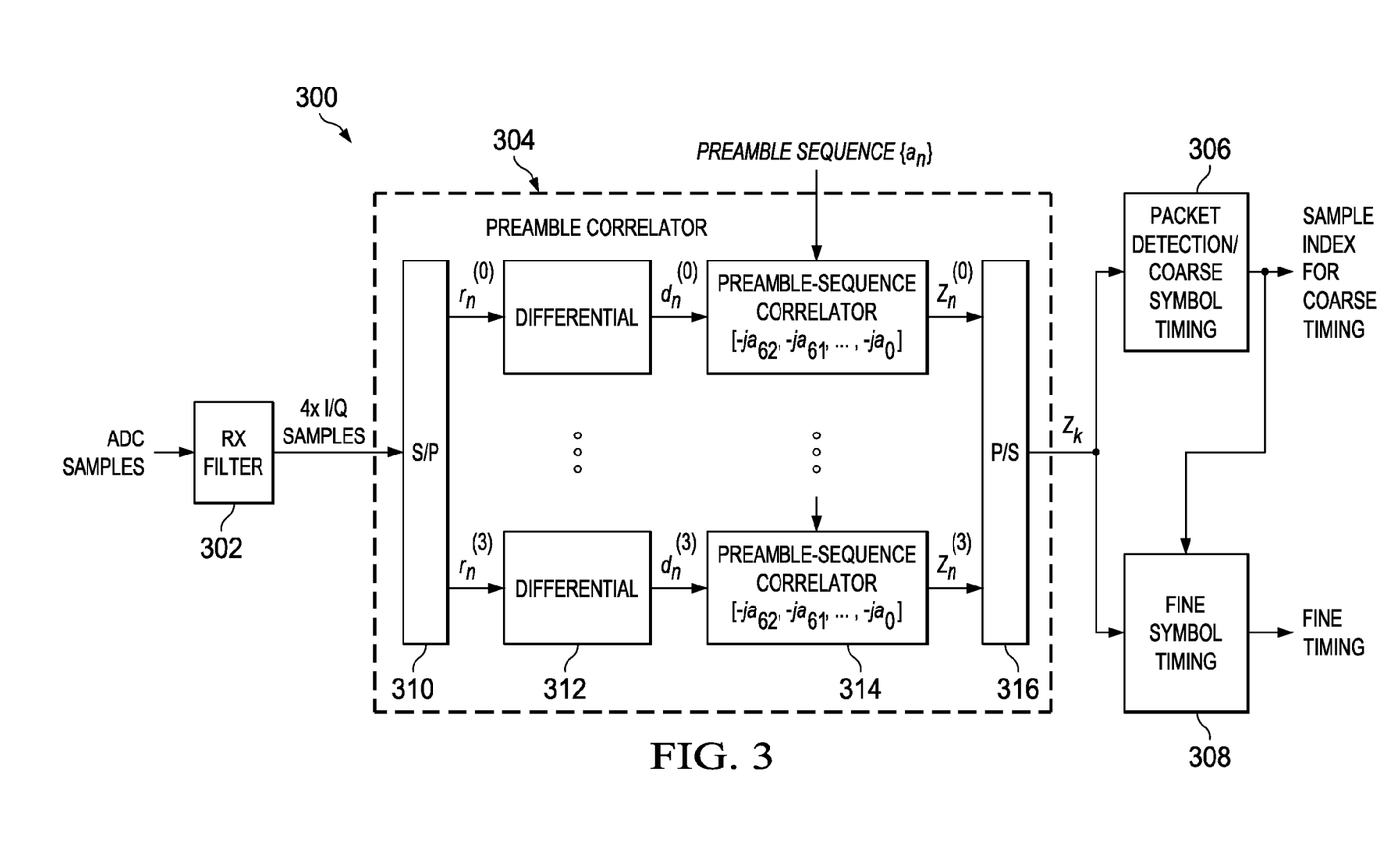
FIG. 3 shows a block diagram of an embodiment of a symbol timing estimator in accordance with various embodiments.

FIG. 3 shows a block diagram of a first embodiment of a symbol timing estimator 300 that can be a sub-component of the preamble processing component 202 in accordance with various embodiments. The symbol timing estimator 300 includes a receive filter 302, a preamble correlator 304, a packet detector/coarse symbol timing estimator 306, and a fine symbol timing estimator 308. The receive filter 302 filters digitized signal samples to produce filtered $R_{os}$ times oversampled (e.g. $R_{os}$=4 is 4× oversampled) in-phase and quadrature samples. The filtered samples are provided to the preamble correlator 304. For $R_{os}$=4, the input to the preamble correlator 304 is denoted as:

$$\ldots, r_{n-1}^{(0)}, r_{n-1}^{(1)}, r_{n-1}^{(2)}, r_{n-1}^{(3)}, r_n^{(0)}, r_n^{(1)}, r_n^{(2)}, r_n^{(3)}, \ldots$$

where the subscript index n changes at symbol rate and the superscript index i represents four different sample phases within a symbol interval.

The preamble correlator 304 includes a deserializer 310, a set of differential detectors 312, a set of preamble sequence correlators 314, and a serializer 316. The deserializer 310 demultiplexes the $R_{os}$ oversampled stream to produce $R_{os}$ sample streams each at 1× sampling, each sample stream corresponding to a sample phase. A differential detector 312 receives each sample stream, and calculates output values for each sample phase as:

$$d_n^{(i)} = r_n^{(i)} r_{n-1}^{(i)*}, \text{ for } i=0,1,2,3, \quad (1)$$

where:
$r_{n-1}^{(i)}$ is the sample that is one-symbol earlier than the current sample $r_n^{(i)}$,
$r_{n-1}^{(i)*}$ represents the complex-conjugate of $r_{n-1}^{(i)}$,
n is the symbol index, and
i represents the sampling phase within a symbol interval.

Thus, the differential detector 312 takes a complex conjugate of the sample corresponding to the previous symbol and multiplies the conjugated one-symbol earlier sample with the current received sample, to calculate a soft-decision symbol value.

A preamble-sequence correlator 314 associated with each sample stream receives the output values produced by a corresponding differential detector 312. The preamble-sequence correlator 314 correlates the received differential detector output stream against the preamble sequence $\{a_n\}$. When the preamble signal is modulated with rotated binary PSK (e.g., as in IEEE 802.15.6), for correlation length N, the output of the preamble-sequence correlator 314 $z_n^{(i)}$ may be given as $$z_n^{(i)} = \sum_{l=0}^{N-1} (-ja_{62-l}) d_{n-l}^{(i)} = \sum_{l=0}^{N-1} a_{62-l} [\text{Im}\{d_{n-l}^{(i)}\} - j\text{Re}\{d_{n-l}^{(i)}\}]. \quad (2)$$

where
$d_n^{(i)}$ is the filter input (i.e., the differential detector output),
$a_n \in \{1,-1\}$ is the bipolar preamble sequence ('1' for bit 0 and '−1' for bit 1), and
$[-ja_{62}, -ja_{61}, \ldots, -ja_{62-N+1}]$ is the filter impulse response.
Note that since all the coefficients of the preamble sequence correlator 314 have the form of ±j, the multiplication operations are simply an exchange of inphase (I) and quadrature (Q) sample, and possible sign changes to I and Q samples using the binary preamble sequence $\{a_n\}$.

The serializer 316 receives the correlation samples $z_n^{(i)}$ generated by the preamble-sequence correlators 314, and multiplexes the symbols $z_n^{(i)}$ into a correlation sample stream $z_k$, where k=$R_{os}$n+i ($R_{os}$=4 for example, for 4× oversampling).

The output $z_k$ of the preamble correlator 304 is provided to the packet detector/coarse symbol timing estimator 306, and to the fine symbol timing estimator 308. The detector/estimator 306 may compute a metric based on $z_k$ for use in packet detection and coarse symbol timing estimation. The metric computation may normalize the magnitude of $z_k$ in some embodiments. In various embodiments, the metric may be any of the magnitude of $z_k$, $$M_k = |z_k|, \quad (3)$$

the power (squared magnitude) of $z_k$, $$M_k = |z_k|, \quad (3)$$

the power (squared magnitude) of $z_k$, $$M_k = |z_k|^2, \quad (4)$$

or either of power and magnitude of $z_k$ divided by an "average_off-peak_level" that estimates a correlation profile (in magnitude or power per $M_k$) for off-the-peak samples (correlator output samples excluding some samples around the correlation peak). The value of "average_off-peak_level" can exclude several large correlation samples, or exclude samples that are larger than a certain threshold.

The packet detector compares the metric $M_k$ with a threshold value to perform packet detection. A packet may be detected when $M_k \geq \gamma_{PD}$, where $\gamma_{PD}$ is the threshold for packet detection, and an index denoting a symbol corresponding to the packet detection is denoted $k_{PD}$.

The coarse symbol timing estimator searches for the peak of metric $M_k$ over a given time interval, for example, $L_{CT}$ symbol length (e.g., $L_{CT}=3$), around or from the time index $k_{PD}$ (i.e., the packet detection index). The coarse symbol timing estimator can provide the sample index for the identified peak as a coarse symbol timing estimate:

$$k_{CT} = \arg\max M_k, k \in [k_{PD}, k_{PD} + R_{os} L_{CT} - 1]. \quad (5)$$

The accuracy of the coarse timing symbol estimation is (at high signal to noise ratio):

$$|\tau| \leq \frac{T_{sym}}{2R_{os}}, \quad (6)$$

where $\tau$ is the timing error, $T_{sym}$ is the symbol duration, and the preamble correlator 304 operates at $R_{os}$ times the symbol rate.

The fine symbol timing estimator 308 receives and processes the coarse symbol timing estimate $k_{CT}$ and the correlator output samples $z_k$ to produce a fine symbol timing estimate that is more accurate than the coarse symbol timing estimate generated by the packet detector/coarse symbol timing estimator 306. The fine symbol timing estimate may be generated by combining the coarse symbol timing estimate and a fine symbol timing error estimate computed by the fine symbol timing estimator 308. The fine symbol timing estimate can be provided to the PSDU processing component 206 and the header processing component 204 (either directly or after further processing), to be used to extract symbols from the header and PSDU. The fine symbol timing estimator 308 computes the fine symbol timing estimate based on correlator output samples prior to and subsequent to the sample identified by the coarse timing estimate $k_{CT}$, where $k_{CT}$ is the sample index corresponding to the coarse symbol timing.

In one embodiment, the fine symbol timing estimator 308 computes a fine symbol timing error estimate $\hat{\tau}$ based on the power of the correlation samples:

$$\hat{\tau} = \frac{1}{\alpha} \cdot \frac{|z_{k_{CT}-\Delta}|^2 - |z_{k_{CT}+\Delta}|^2}{|z_{k_{CT}}|^2} \quad (7)$$

where $z_k$ is the preamble correlator output (complex-valued) at $R_{os}$ times the symbol rate, and $k_{CT}$ is the symbol index for the coarse symbol timing; therefore, $z_{k_{CT}}$ is the correlation value at the coarse timing index, $z_{k_{CT}-\Delta}$ is the correlation value $\Delta$-sample earlier than the coarse timing index (e.g., $\Delta=1$), $z_{k_{CT}+\Delta}$ is the correlation value $\Delta$-sample later than the coarse timing index; and $\alpha$ is a constant that produces a linear relationship between the actual symbol timing error and the estimated timing error. The value of $\alpha$ is may be predetermined.

In another embodiment, the fine symbol timing estimator 308 computes a fine symbol timing error estimate $\hat{\tau}$ as in equation (7) above, and further limits the timing estimate to a predetermined range of values as:

$$\hat{\tau} = T\left(\frac{1}{\alpha} \cdot \frac{|z_{k_{CT}-\Delta}|^2 - |z_{k_{CT}+\Delta}|^2}{|z_{k_{CT}}|^2}\right) \quad (8)$$

where $T(x)$ is a truncation function, for example, $$T(x) = \begin{cases} 0.5, & \text{if } x > 0.5 \\ x, & \text{if } |x| \leq 0.5 \\ -0.5, & \text{if } x < -0.5 \end{cases} \quad (9)$$

In another embodiment, the fine symbol timing estimator 308 computes a fine symbol timing error estimate $\hat{\tau}$ in a manner similar to that of equation (7), but uses a sum of the preceding and succeeding correlation sample powers, rather than coarse timing index sample power, in the denominator.

$$\hat{\tau} = \frac{1}{\alpha} \cdot \frac{|z_{k_{CT}-\Delta}|^2 - |z_{k_{CT}+\Delta}|^2}{|z_{k_{CT}-\Delta}|^2 + |z_{k_{CT}+\Delta}|^2} \quad (10)$$

In another embodiment, the fine symbol timing estimator 308 computes a fine symbol timing error estimate $\hat{\tau}$ as in equation (10), and further limits the fine timing error estimate to a predetermined range of values using a truncation function as shown in equation (9).

$$\hat{\tau} = T\left(\frac{1}{\alpha} \cdot \frac{|z_{k_{CT}-\Delta}|^2 - |z_{k_{CT}+\Delta}|^2}{|z_{k_{CT}-\Delta}|^2 + |z_{k_{CT}+\Delta}|^2}\right) \quad (11)$$

In another embodiment, the fine symbol timing estimator 308 computes a fine symbol timing error estimate $\hat{\tau}$ in a manner similar to that of equation (7), but applies a denominator that is a weighted sum of the coarse timing index correlation sample power and the sum of powers of the correlation samples preceding and succeeding the coarse timing index.

$$\hat{\tau} = \frac{1}{\alpha} \cdot \frac{|z_{k_{CT}-\Delta}|^2 - |z_{k_{CT}+\Delta}|^2}{\rho|z_{k_{CT}}|^2 + (1-\rho)(|z_{k_{CT}-\Delta}|^2 + |z_{k_{CT}+\Delta}|)^2} \quad (12)$$

where $\rho$ is a predetermined constant that controls weighting between $|z_{k_{CT}}|^2$ and $(|z_{k_{CT}-\Delta}|^2 + |z_{k_{CT}+\Delta}|^2)$.

In another embodiment, the fine symbol timing estimator 308 computes a fine symbol timing error estimate $\hat{\tau}$ as in equation (12), and further limits the timing error estimate to a predetermined range of values using a truncation function as shown in equation (9).

$$\hat{\tau} = T\left(\frac{1}{\alpha} \cdot \frac{|z_{k_{CT}-\Delta}|^2 - |z_{k_{CT}+\Delta}|^2}{\rho|z_{k_{CT}}|^2 + (1-\rho)(|z_{k_{CT}-\Delta}|^2 + |z_{k_{CT}+\Delta}|^2)}\right) \quad (13)$$

In another embodiment, the fine symbol timing estimator 308 computes a fine symbol timing error estimate $\hat{\tau}$ in a manner similar to that of equation (7), but applies an approximation of the maximum correlation sample value as the denominator rather than the coarse timing index sample power.

$$\hat{\tau} = \frac{1}{\alpha} \cdot \frac{|z_{k_{CT}-\Delta}|^2 - |z_{k_{CT}+\Delta}|^2}{C} \quad (14)$$

where C is a constant that approximates the maximum correlation sample value (with zero timing offset).

In another embodiment, the fine symbol timing estimator 308 computes a fine symbol timing error estimate $\hat{\tau}$ as in equation (14), and further limits the timing error estimate to a predetermined range of values using a truncation function as shown in equation (9).

$$\hat{\tau} = T\left(\frac{1}{\alpha} \cdot \frac{|z_{k_{CT}-\Delta}|^2 - |z_{k_{CT}+\Delta}|^2}{C}\right) \quad (15)$$

Some embodiments of the fine symbol timing estimator 308 compute a fine symbol timing error estimate by applying the operations of one or more of equations (7)-(8) and (10)-(15), but apply correlator sample magnitude $|z_k|$ rather than correlator sample power $|z_k|^2$ in the applied equation.

Figure 4:
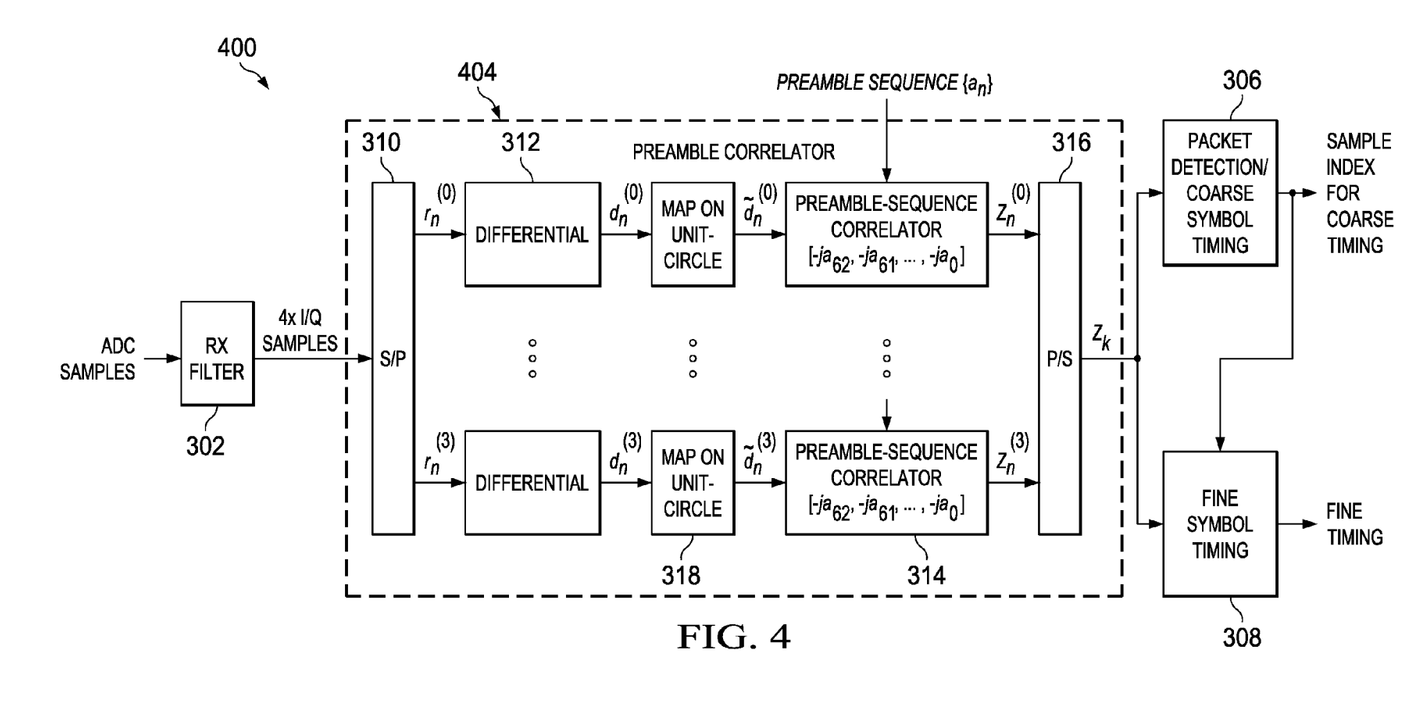
FIG. 4 shows a block diagram of an embodiment of a symbol timing estimator in accordance with various embodiments.

FIG. 4 shows a block diagram of an embodiment of a symbol timing estimator 400 that can be a sub-component of the preamble processing component 202 in accordance with various embodiments. The symbol timing estimator 400 is similar to the symbol timing estimator 300 shown in FIG. 3, and further includes a set of map on unit circle units 318 coupled to the differential detectors 312 and the preamble sequence correlators 314.

The amplitude of the signal received over a wireless channel can vary, for example, depending on the distance between the transmitter and receiver and the gain at the receiver front end. The received signal can be modeled as a complex signal with a real component and an imaginary component, and its magnitude depends on the signal strength of the received signal. Typically in the receiver, there is an automatic gain control ("AGC") block that attempts to compensate for variation in the received signal level. However, AGC is not always perfect, and therefore, the amplitude of the input samples to the packet detector/coarse symbol timing estimator may vary, which affects the performance of packet detection, coarse symbol timing estimation, and fine symbol timing estimation.

The map on unit-circle block 318 can mitigate the effect described above. By using the map on unit-circle block 318, the preamble-sequence correlator 421, 461 looks at the phase information only and does not use the magnitude information.

The map on unit-circle block 318 takes the phase information of the symbol $d_n^{(i)}$. The mapping operation may be represented mathematically as follows:

$$\tilde{d}_n^{(i)} = \frac{d_n^{(i)}}{|d_n^{(i)}|} \quad (16)$$

In some embodiments, the phase information shown in equation (16) may be calculated using the CORDIC algorithm or another algorithm known in the art.

In some embodiments, the explicit division operation shown in equation (16) is not necessary. That is, the symbol may be quantized, using a quantization codebook located, for example, either between the differential detector 312 and the deserializer 310 or between the differential detector 312 and the preamble-sequence correlator 314 and each quantization point in the quantization codebook is on or around a unit-circle. A point is around the unit circle if the point is not on the unit circle, but is intended to represent a point on the unit circle (e.g., the precision with which the point is represented causes the point to fall not on the unit circle).

Additionally, in some embodiments, the locations of the differential detector 312 and the map on unit-circle unit 318 shown in FIG. 4 may be reversed. That is, the map on unit-circle unit 318 may be located between the differential detector 312 and the deserializer 310. The differential detector 312 would then determine and provide a symbol signal to the preamble-sequence correlator 314 in response to the parallel received signal with magnitude information removed.

Figure 5:
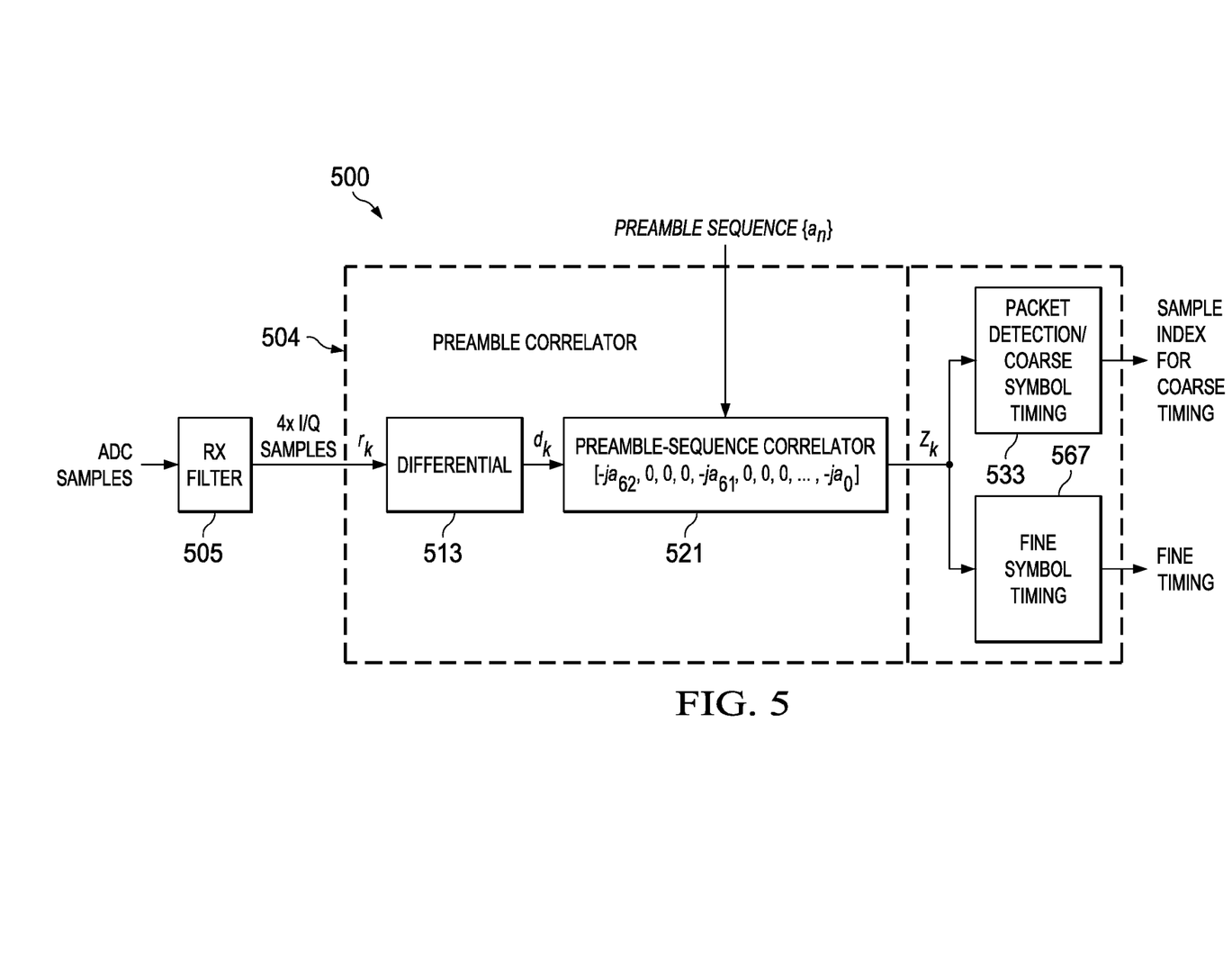
FIG. 5 shows a block diagram of an embodiment of a symbol timing estimator in accordance with various embodiments.

FIG. 5 shows a block diagram of an embodiment of a symbol timing estimator 500 in accordance with various embodiments. The symbol timing estimator 500 is functionally equivalent to the symbol timing estimator 300, but the symbol timing estimator 500 includes a single differential detector 513 and a single preamble-sequence correlator 521 rather than multiple differential detectors 312 and multiple preamble-sequence correlators 314 as in the symbol timing estimator 300. Thus, the symbol timing estimator 500 includes a single differential detector 513 and preamble-sequence correlator 521 that operate at the rate of the oversampled data stream $r_k$. The receive filter 505, packet detector/coarse symbol timing estimator 533, and fine symbol timing estimator 567 are equivalent to receive filter 302, packet detector/coarse symbol timing estimator 306, and fine symbol timing estimator 308 of the symbol timing estimator 300.

Considering an oversampling rate of 4 (other oversampling rates may also be applied), the differential detector 513 calculates received symbol values as:

$$d_k = r_k r_{k-4}^*, \quad (17)$$

where:

k is the sample index, $r_{k-4}$ is the sample that is one-symbol earlier than the current sample $r_k$, $r_{k-4}^*$ represents the complex-conjugate of $r_{k-4}$.

That is, the differential detector 513 processes the received samples taking a complex conjugate of the sample corresponding to the previous symbol and multiplying the conjugated one-symbol earlier sample with the current received sample, to calculate the (soft-decision) symbol values. The differential detector output symbols are provided to the preamble-sequence correlator 521.

The preamble-sequence correlator 521 correlates the symbols $d_k$ received from the differential detector 513 with the preamble sequence $\{a_n\}$. When the preamble sequence is modulated with rotated differential binary PSK (e.g., as in IEEE 802.15.6), for correlation length N (symbols), the output of the preamble sequence correlator 521 $z_k$ may be given as $$z_k = \sum_{l=0}^{R_{os}N-1} h_l d_{k-l} \quad (18)$$

where $d_k$ is the filter input, $R_{os}$ is the oversampling rate, $h_l$ ($l=0, 1, \ldots, R_{os}N-1$) is the filter impulse response, and is defined as the l-th element of $[-ja_{62},0,0,0,-ja_{62},0,0,0,\ldots,-ja_{62-N},0,0,0,-ja_{N+1}]$, $a_n \in \{1,-1\}$ is a bipolar preamble sequence ('1' for bit 0 and '−1' for bit 1), N is the correlation length in symbol time, and $z_k$ is the correlator 521 output signal.

Figure 6:
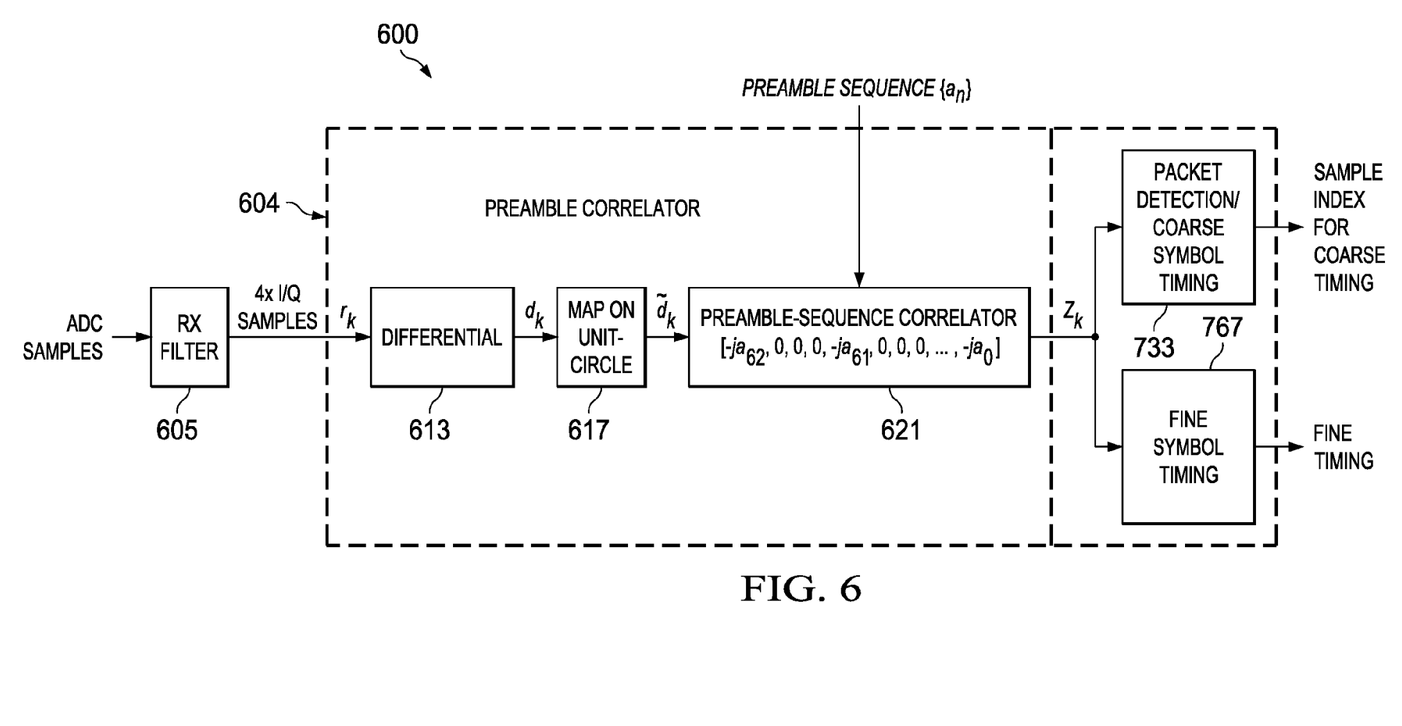
FIG. 6 shows a block diagram of an embodiment of a symbol timing estimator in accordance with various embodiments.

FIG. 6 shows a block diagram of an embodiment of a symbol timing estimator 600 in accordance with various embodiments. The symbol timing estimator 600 is similar to the symbol timing estimator 500, and further includes a map on unit circle module 617. The receive filter 605, differential detector 613, preamble-sequence correlator 621, packet detector/coarse symbol timing estimator 733 and fine symbol timing estimator 767 are respectively equivalent to the receive filter 505, differential detector 513, preamble-sequence correlator 521, packet detector/coarse symbol timing estimator 533 and fine symbol timing estimator 567 of the symbol timing estimator 500.

The map on unit-circle unit 617 can eliminate the effect of the received signal strength, as further discussed above with regard to the map on unit circle unit 318, looking at the phase information only and omitting the magnitude information.

The map on unit-circle unit 617 receives the differential detector output symbol $d_k$, and performs a mapping operation that may be represented mathematically as:

$$\tilde{d}_k = \frac{d_k}{|d_k|} \quad (19)$$

Various components of the symbol timing estimators 300, 400, 500, 600, including at least some portions of the preamble correlator 304, 404, 504, 604, the packet detector/coarse symbol timing estimator 306, 533, 733, and the fine symbol timing estimator 308, 567, 767 can be implemented using a processor and software programming that causes the processor to perform the operations described herein. In particular, software programming can be used to cause a processor to generate the fine symbol timing estimates that improve symbol timing accuracy. Suitable processors include, for example, general-purpose processors, digital signal processors, and microcontrollers. Processor architectures generally include execution units (e.g., fixed point, floating point, integer, etc.), storage (e.g., registers, memory, etc.), instruction decoding, peripherals (e.g., interrupt controllers, timers, direct memory access controllers, etc.), input/output systems (e.g., serial ports, parallel ports, etc.) and various other components and sub-systems. Software programming executable by a processor can be stored in a computer readable storage medium. A computer readable storage medium comprises volatile storage such as random access memory, non-volatile storage (e.g., a hard drive, an optical storage device (e.g., CD or DVD), FLASH storage, or combinations thereof.

Some embodiments can implement portions of the preamble correlator, the packet detector/coarse symbol timing estimator, and the fine symbol timing estimator described herein using dedicated circuitry (e.g., dedicated circuitry implemented in an integrated circuit). Some embodiments may use a combination of dedicated circuitry and software executed by a processor. Selection of a hardware or software/processor implementation of embodiments is a design choice based on a variety of factors, such as cost, time to implement, and the ability to incorporate changed or additional functionality in the future.

Figure 7:
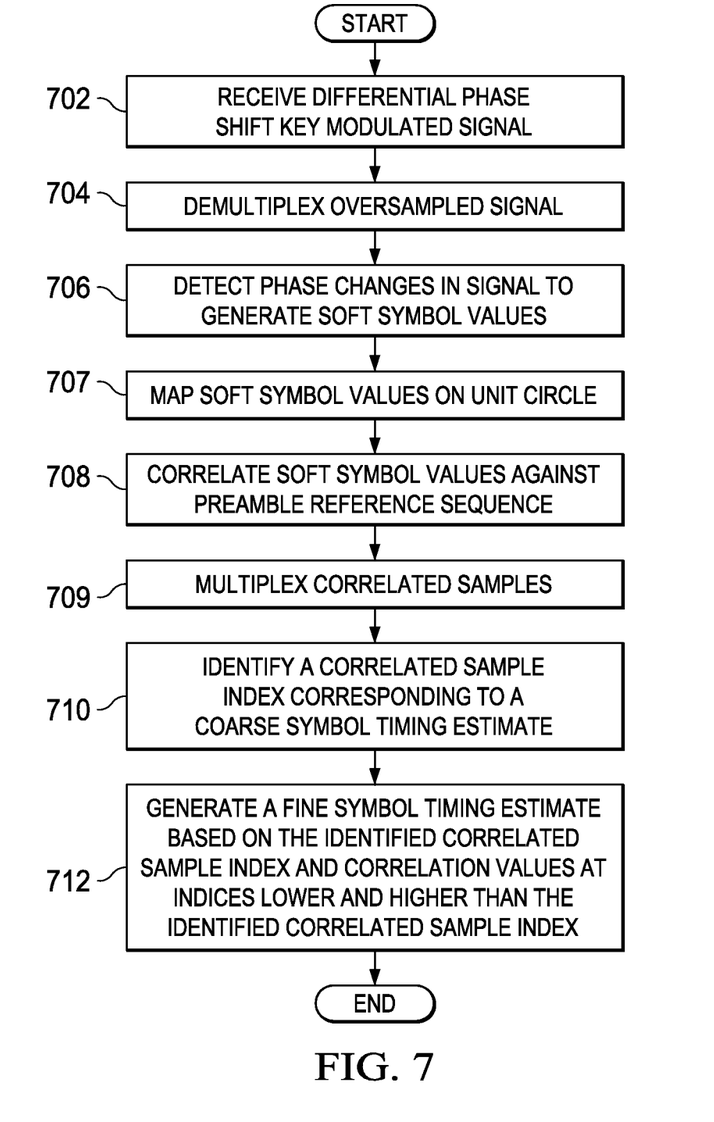
FIG. 7 shows a flow diagram for a method for estimating symbol timing in accordance with various embodiments.

FIG. 7 shows a flow diagram for a method for estimating symbol timing in accordance with various embodiments. Though depicted sequentially as a matter of convenience, at least some of the actions shown can be performed in a different order and/or performed in parallel. Additionally, some embodiments may perform only some of the actions shown. Embodiments of the method may be implemented by the symbol timing estimators 300, 400, 500, and 600 disclosed herein. In some embodiments, at least some of the operations of FIG. 7, as well as other operations described herein, can be implemented as instructions stored in a computer readable medium and executed by a processor.

In block 702, the wireless network 100 is operating and the nodes 102 are communicating with the hub 106. The PHY receiver 104 receives a transmitted signal modulated with differential PSK. More specifically, the received signal may be modulated with rotated differential M-ary PSK.

The received signal is oversampled, and for parallel architectures (e.g., as shown in FIGS. 3-4), in block 704, the samples of the received signal are demultiplexed by the deserializer 310 in accordance with the degree of oversampling to form a plurality of sample streams.

In block 706, each sample stream is provided to a differential detector 312 that detects phase changes in the signal to generate soft-decision symbol values. Some embodiments additionally map the symbol values generated by the differential detector 312 onto a unit circle in order to mitigate the effects signal amplitude variation on symbol timing estimation.

In block 707, the sample values generated the differential detector 312 are provided to a map on unit circle unit 318 where modified soft-decision symbol values are generated based on the phase information in the symbol values provided by the differential detector 312. In some embodiments, the soft-decision symbol values are mapped in accordance with equation (16) or mapped using a quantization codebook where each symbol is mapped to a quantization point in the codebook that is on or around a unit-circle as described above.

In block 708, is the soft symbol values are provided to a preamble-sequence correlator 314. The preamble-sequence correlator 314 correlates the symbol values against a preamble reference sequence. In some embodiments, IEEE standard BAN embodiments for example, the preamble reference sequence is 63 symbols long. In some embodiments, multiple correlated sample streams are multiplexed into a single correlated sample stream using the serializer 316.

In parallel embodiments (e.g., FIGS. 3-4), in block 709, correlated samples generated by the preamble-sequence correlators 314 are multiplexed into a single correlated sample stream.

In block 710, the correlated sample stream is provided to the packet detector/coarse symbol timing estimator 306. The packet detector portion of the unit 306 identifies a correlation sample index corresponding to arrival of a packet. Based on the packet detection index and a range of correlation samples, the coarse symbol timing estimator identifies a sample index (for a correlation sample) corresponding to a coarse symbol timing estimate.

In block 712, the coarse symbol timing estimate (i.e., the index of a correlation sample identifying coarse symbol timing) is provided to the fine symbol timing estimator 308. The fine symbol timing estimator generates a fine symbol timing estimate that is more accurate than the coarse symbol timing estimate. The fine symbol timing estimate is based on the coarse symbol timing estimate (i.e., the coarse timing sample index), a first correlation sample value at first index that is lower than the sample index corresponding to a coarse symbol timing estimate, and a second correlation sample value at a second index that is higher than the sample index corresponding to a coarse symbol timing estimate. The fine symbol timing estimator 308 may apply any of the estimation operations disclosed herein via equations (7)-(8) and (10)-(15) to generate the fine symbol timing estimate.

The fine symbol timing estimate is provided to the header processing component 204 and the PSDU processing component 206 to facilitate accurate extraction of symbols from the PLOP header and the PSDU.

Figure 8:
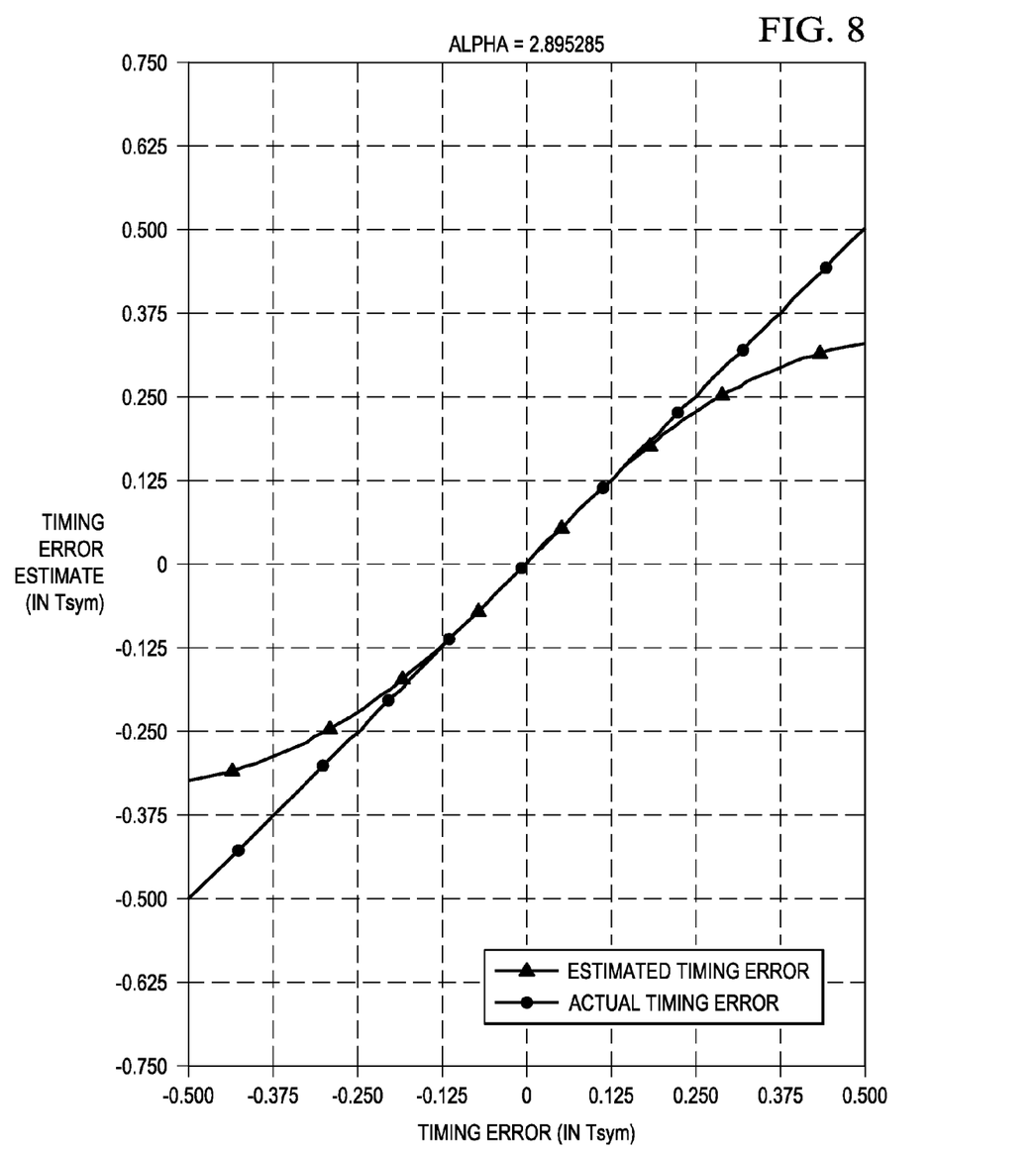
FIG. 8 show a graph of symbol timing error estimated by embodiments of a symbol timing estimator.

FIG. 8 show a graph of symbol timing error estimated by an embodiment of the symbol timing estimator 400 including fine symbol timing estimation in accordance with equation (10) above. As shown in FIG. 8, the estimated timing error generated by the fine symbol timing estimator 308 closely tracks the actual symbol timing error, thereby providing improved symbol timing accuracy over a PHY receiver not including fine symbol timing estimation. Other symbol timing estimators and fine symbol timing estimation algorithms disclosed herein provide similar results.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A preamble symbol timing extraction system, comprising:
a preamble correlator configured to generate correlation samples by correlating symbols derived from differential phase shift keyed data with a correlation reference sequence;
a coarse symbol timing estimator configured to, generate a coarse preamble symbol timing estimate based on the correlation samples, wherein the coarse preamble symbol timing estimate comprises a coarse timing index value that identifies coarse timing for symbol acquisition, and a fine symbol timing estimator produces a fine preamble symbol timing estimate based on the coarse timing index value and correlation samples immediately adjacent to a correlation sample corresponding to the coarse timing index value; and
the fine symbol timing estimator configured to identify a coarse timing correlation sample corresponding to the coarse preamble symbol timing estimate, an early correlation sample immediately preceding the coarse timing correlation sample, and a late correlation sample immediately following the coarse timing correlation sample, and to, generate the fine preamble symbol timing estimate by combining the early correlation sample, the late correlation sample, and, optionally, the coarse timing correlation sample, the fine symbol timing estimator furthered configured to generate the fine preamble symbol timing estimate based on a difference in power of the early correlation sample and power of the late correlation sample and,
wherein the fine symbol timing estimator is configured to divide the difference by a divisor selected from a group consisting of: power of the coarse timing correlation sample; magnitude of the coarse timing correlation sample; sum of power of the early correlation sample and power of the late correlation sample; sum of magnitude of the early correlation sample and magnitude of the late correlation sample; sum of weighted power of the early correlation sample and power of the late correlation sample, and weighted power of the coarse timing sample; sum of weighted magnitude of the early correlation sample and magnitude of the late correlation sample, and weighted magnitude of the coarse timing sample; and a predetermined maximum correlation value.

2. The preamble symbol timing extraction system of claim 1, wherein the preamble correlator comprises a single preamble sequence correlator configured to correlate each of the symbols derived from differential phase shift keyed data.

3. The preamble symbol timing extraction system of claim 1, further comprising a map on unit circle unit upstream from the preamble correlator, and configured to generate, from an input symbol, a mapped symbol value that is solely on phase information of the input symbol.

4. The preamble symbol timing extraction system of claim 1, further comprising a map on unit circle unit upstream from the preamble correlator, and configured to generate, from an input symbol, a mapped symbol value that is based on quantization of the input symbol using a codebook having code points defined on or around a unit circle.

* * * * *